Dec. 15, 1942.                E. F. HARRISON ET AL                2,304,822
              SYSTEM FOR DETERMINING EFFICIENCY OF SELF-PROPELLED VEHICLES
                        Filed May 1, 1939            3 Sheets-Sheet 1
Fig. 1.
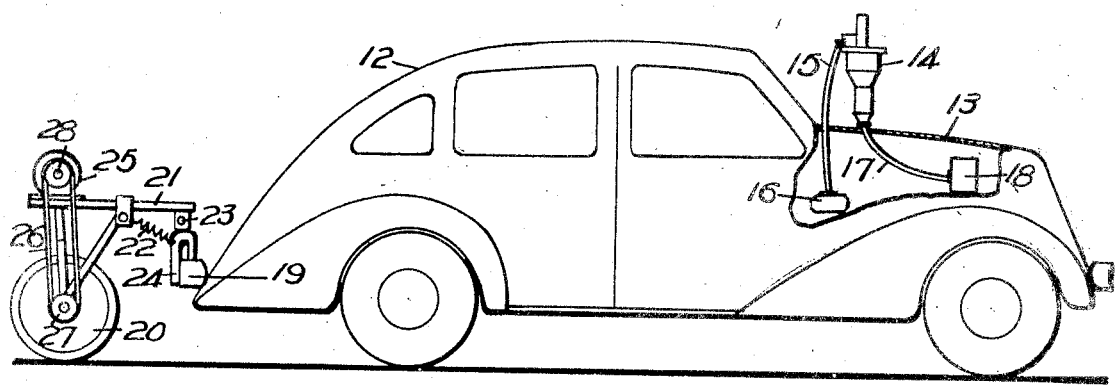
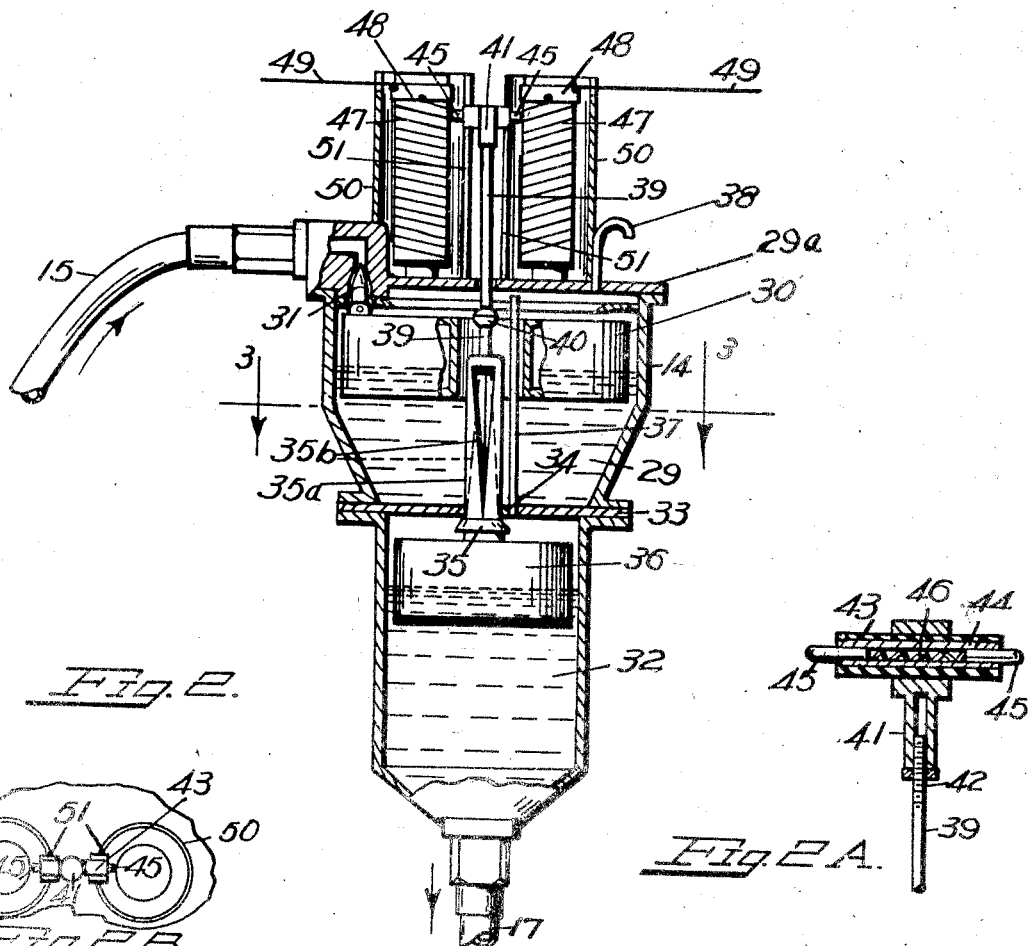
Fig. 2.
Fig. 2A.
Fig. 2B.
INVENTORS
EDWARD F. HARRISON,
RAYMOND C. GIESE and
OTTO A. PAWLICK
BY Rollandet, McGrew & Campbell
ATTORNEYS Dec. 15, 1942.   E. F. HARRISON ET AL   2,304,822
SYSTEM FOR DETERMINING EFFICIENCY OF SELF-PROPELLED VEHICLES
Filed May 1, 1939   3 Sheets-Sheet 2

INVENTORS
EDWARD F. HARRISON, RAYMOND C. GIESE
and OTTO A. PAWLICK
BY
Rollander, McGrew & Campbell
ATTORNEYS INVENTORS
EDWARD F. HARRISON, RAYMOND C. GIESE
and OTTO A. PAWLICK
BY
Rollandet, McGrew & Campbell
ATTORNEYS Patented Dec. 15, 1942

2,304,822

UNITED STATES PATENT OFFICE 2,304,822

SYSTEM FOR DETERMINING EFFICIENCY OF SELF-PROPELLED VEHICLES

Edward F. Harrison, Denver, Colo., Raymond C. Giese, Springfield, Ill., and Otto A. Pawlick, South Orange, N. J.

Application May 1, 1939, Serial No. 271,334

7 Claims. (Cl. 235—61)

This invention relates to method and means of measuring miles per gallon performance of internal combustion engines and the like, and more particularly relates to improvements in performance meters of the general type disclosed in Pawlick et al. Patent No. 1,754,039, of April 8, 1930, for Apparatus for measuring and indicating efficiencies.

Internal combustion engines are subject to numerous factors influencing efficiency and self-propelled vehicles powered by such engines are influenced by additional factors. Among the most common factors thus influencing the over-all performance of vehicles of this type are motor temperature, carburetor adjustment, altitude, timing of the motor, type of fuel used, condition of road surface, grade of road, velocity and direction of wind, inflation of tires, load carried by vehicle, etc.

Usually in the operation of self-propelled vehicles and particularly automobiles and trucks, the fuel consumption may be measured in units, such as gallons and the distance travelled plus indicating speed at any given moment of operation also are known to the operator.

However, vehicles of this type are subject to continuous variations in one or more of the factors above noted and it will be apparent that such indications, even if accurate, would fail to advise the operator of the efficiency of the vehicle other than the amount of fuel consumed during a given interval, usually a trip, which by individual mathematical computation might be interpreted into average miles per gallon determination.

At the present time considerable stress is being placed on measurement of car performance both by manufacturers and users. Numerous attempts have been made to devise methods which will obtain the results quickly and with at least some degree of accuracy. Frequently, a measured amount of gasolene is taken to be used in conjunction with the indication of distance travelled and thus provide a measure of miles per gallon efficiency. To this end, the speedometer of the car is used to indicate the distance travelled and in the operation the fuel measurement includes the initial starting operation plus any stops necessitated in travel, such as occasioned by traffic lights, for example, or other traffic conditions.

As a consequence, the variations influencing the indicating of distance travelled, coupled with the errors in indicating gasolene consumption in relation to travel, produce a final result which at best is only an average of conditions actually encountered and is subject to so much error that it scarcely approaches accuracy.

To avoid the error encountered in speedometer readings, a fifth wheel, carefully calibrated, is sometimes used to measure travel. But even when this measure is more accurate, nothing better than an average determination is possible, so long as fuel consumption is subject to erroneous indications in the respects noted hereinbefore.

Whenever one or more of the foregoing factors vary during a given test, any efficiency measurement which fails to take such factors into account will give an inaccurate report of over-all conditions and will be unreliable where continuous readings are a desideratum.

It is an object of the present invention to provide a method of measuring miles per gallon consumption of internal combustion motors and self-propelled vehicles which takes into account variations in the several factors influencing efficiency, thereby permitting use of continuous indications which are substantially accurate at any given moment in the operation of such vehicle.

Another object of the invention is to employ mechanical forces responsive to conditions determining miles per gallon consumption and by converting such mechanical forces into components of electrical energy, provide a measurable media which is instantly responsive to even minor variations in the mechanical forces.

A further object is to provide a method of measuring efficiency or performance, which is adapted for application to various types of self-propelled vehicles, such as motor cars, buses, trucks, railway locomotives, airplanes, motor boats, and ships.

Still another object of the invention is the provision of apparatus that will continuously indicate travel of a vehicle in miles per hour, fuel consumption in gallons per hour and also indicate fuel consumption in miles per gallon.

A still further object of the invention is to provide performance meters which may be incorporated as permanent installations in self-propelled vehicles, as well as being embodied in separate test units for installation on a variety of vehicles solely for test purposes.

Other objects reside in novel methods of operation and novel combinations and arrangements of parts, all of which will appear more fully in the course of the following description.

In attaining the purposes of the present invention, it has been necessary to devise novel operating procedure, as well as novel structure. To this end, it has been necessary to measure actual travel or actual speed of the vehicle, the efficiency of which is to be measured, in contradistinction to any measurement of the rate of operation of moving parts of the vehicle which do not truly indicate the speed thereof under all conditions of operation.

It is also necessary to have an actual and accurate measure of fuel consumption in order that the two factors of fuel consumed and rate of speed or distance travelled may be integrated and produce a measurable resultant that gives a true indication or recording of miles per gallon performance.

In this connection, it will be understood that the actual travel or speed measurement is essential where correct determinations are the desideratum, but when it is desired to employ the present invention as a permanent installation on a given vehicle, the benefits of such actual measurement may be sacrificed for other gain, as will be explained hereinafter.

By employing a measurement that is responsive to and variable in direct proportion to the actual speed or distance travelled and measuring the rate of flow of fuel delivered to the motor of the vehicle and maintaining the measuring media responsive to such rate of flow, it is possible to modify the responsive action of the speed-measuring media by the responsive action of the fuel measuring media to obtain a resultant which is measurable and thus provides a true indication of miles per gallon performance at any given moment in the vehicle's operation.

Preferably, although not necessarily, such operation is attained by converting the mechanical force of speed measurement into a generated current of electricity and modifying the current by the action of a resistance varied by the mechanical movement of the fuel measurement media to indicate on suitable instruments the value of the resultant thus established.

In other words, when represented by a curve, the output voltage of the generator designated as one ordinate and the demand for fuel represented by the other ordinate will result in a straight line representation.

To provide a measurement of the output of the generator modified by a function of the fuel demand, it has been found feasible to vary the current recording of the output circuit by the action of a float-controlled metering valve. With a demand for increase in fuel, the metering valve changes position in direct proportion to the fuel demand and electrical contacts directly connected with the metering valve are moved to enter into the generator output circuit an amount of resistance which is in direct proportion to the fuel demand. In this way, the straight line relationship above noted is attained.

From the foregoing, it will be apparent that an operation which integrates the measured fuel consumption of the vehicle and the measured speed of the vehicle and modifies the one by the other to produce a resultant which is a direct measurement of a mathematical division of the one by the other, provides a means for continuous determination of miles per gallon efficiency of the vehicle.

While various structural arrangements may be devised to satisfy the mathematical requirements of the operation, the structure illustrated in the accompanying drawings and described hereinafter has been found well suited to attain the objects set forth hereinbefore.

For purposes of illustrating the novel features of the present invention, a typical embodiment of the invention has been shown on the accompanying drawings, but it will be understood that the invention is susceptible of embodiment in a variety of forms and the structure illustrated is not intended as a limitation of the structural application of the invention.

To afford a better understanding of the invention, reference is now made to the accompanying drawings in the several views of which corresponding parts have been designated similarly and in which:

Figure 1 is a side elevation, partially broken away, showing the application of the component parts of a performance measuring apparatus embodying the present invention to a typical automobile in the preferred manner of assembly for test purposes;

Figure 2 is a vertical section illustrating details of the apparatus shown in Figure 1 and drawn on an enlarged scale;

Figure 2A is a fragmentary sectional view drawn on a further enlarged scale to illustrate certain of the details shown in Figure 2;

Figure 2B is a fragmentary plan view of the apparatus illustrated in Figure 2;

Figure 3:
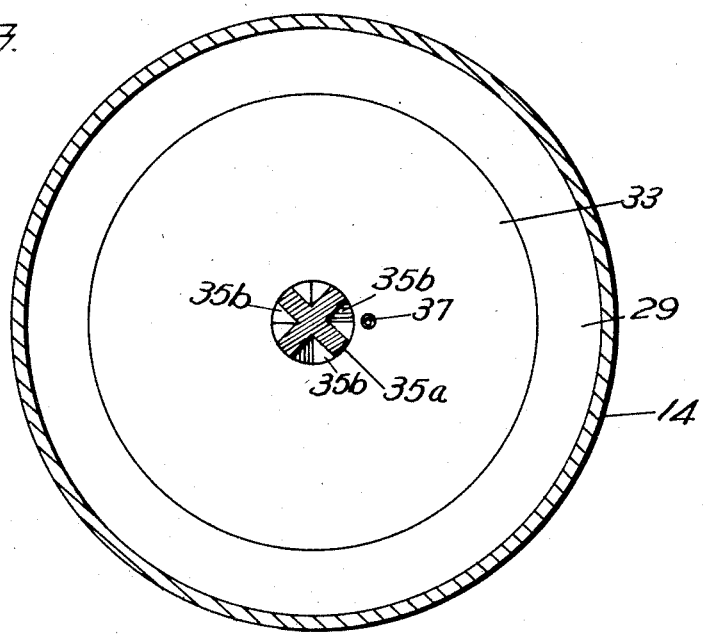
Figure 3 is a section taken along the line 3—3, Figure 2 and drawn to an enlarged scale.

In the drawings, Figure 1 illustrates an arrangement in which an automobile 12 has been equipped for a test of its miles per gallon performance. Mounted on the hood 13 of the automobile is a fuel flowmeter 14 provided with a flexible conduit 15 attached to the fuel pump 16 of the car.

A second flexible conduit 17 connects the flowmeter 14 with the carburetor 18 and as a consequence all fuel used by the motor (not shown) is required to pass through flowmeter 14.

At the rear end of the automobile 12, the bumper 19 is used as a support for a fifth wheel or out-rigger wheel 20 connected therewith through the intermediary of a frame structure 21. A spring 22 urges the frame downwardly about a pivotal axis 23 on a bumper-engaging clamp member 24.

A direct current generator 25 is mounted on the frame 21 and is driven by the out-rigger wheel 20 in exact accordance with the forward speed of the automobile 12 through the intermediary of a belt 26 mounted on similar pulleys 27 and 28, positioned on the out-rigger wheel 20 and the generator 25, respectively.

Figure 5:
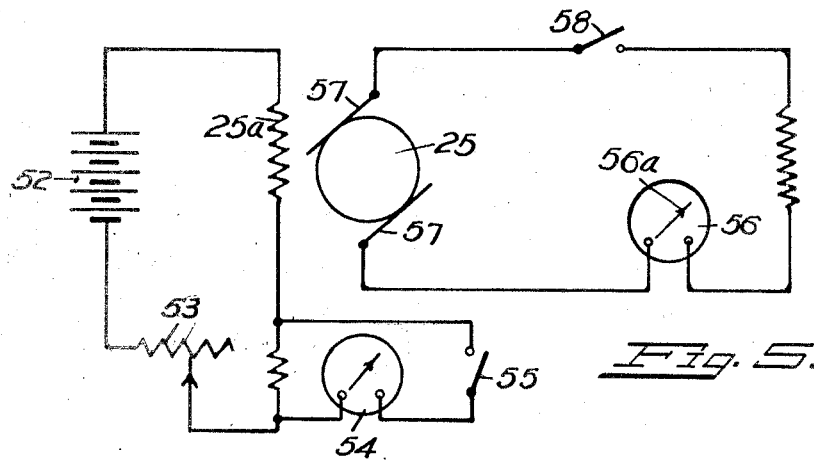
Figure 5 is a wiring diagram illustrating the arrangement of instruments and circuits employed to indicate miles per hour travel of a vehicle to which the invention has been applied.
Figure 6:
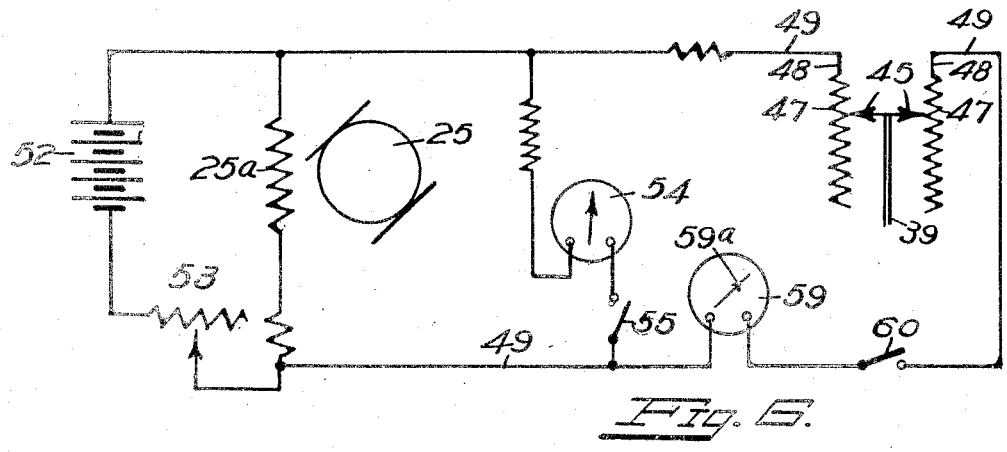
Figure 6 is a wiring diagram illustrating the arrangement of instruments and circuits to indicate gallons per hour fuel consumption of a vehicle to which the invention has been applied.
Figure 7:
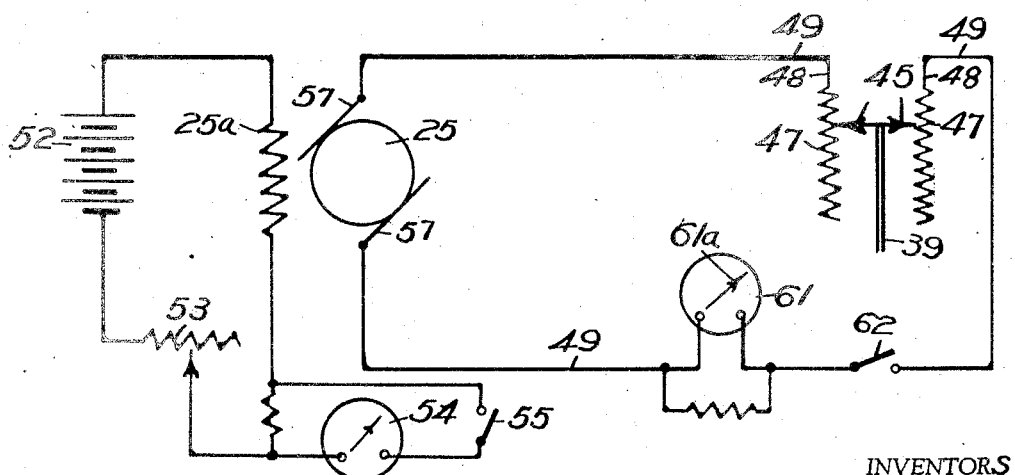
Figure 7 is a wiring diagram illustrating the arrangement of instruments and circuits used to indicate direct miles per gallon fuel consumption of a vehicle to which the invention has been applied.

The generator 25 is so constructed that its electrical output is in direct proportion to the forward distance and speed of travel of the automobile 12, and by suitable wiring connections, represented diagrammatically in Figures 5, 6 and 7, but not shown in Figure 1, the electrical output of the generator is conducted to indicating and/or recording instruments of the apparatus.

Preferably, such instruments are located within the car 12 to facilitate use and observation when the car is operated for test purposes. By means of such arrangement, two measurements of fundamental conditions are provided. Thus, the fuel meter 14 measures all fuel consumed by the motor during the test period and the generator 25 measures the actual forward speed of the vehicle exactly in the electrical output, irrespective of variations in any one or more of the several factors influencing performance.

While in the various uses of the invention variations in the type of generator drive will be necessary, the use of the out-rigger wheel as herein described and illustrated affords a more accurate means of measuring travel and speed of the vehicle than any other medium so far investigated. Because of its accuracy, the fifth wheel design is a preferred embodiment whenever precision of measurement is required. However, as will be explained hereinafter, when permanent installations are contemplated for continuous usage on a given vehicle, the scientific advantage of the fifth wheel arrangement may be sacrificed for advantages in other respects.

The selection of the fifth wheel as a means of operating the generator to establish a direct proportion between generator output and distance and speed of travel, makes possible the utilization of one instrument unit adaptable for measuring performance of a variety of vehicles in which there will be differences in such factors as gear ratio, tire size and tire pressure.

Further, it eliminates the necessity of mechanical changes, alterations or substitutions to accommodate it to a given vehicle and eliminates the need for making changes in the vehicle to permit testing.

In developing mechanism operative under the variety of conditions encountered in general usage, it is necessary to employ an integration of the mechanical forces acting in response to fuel consumption and speed in such a way that an actual indication of miles per gallon performance may be obtained at all times.

To this end, the structure illustrated in Figures 2, 2A and 2B has been developed. The fuel flow-meter 14 has been designed to measure the rate of flow of fuel through an orifice, as distinguished from any quantitative measurement of fuel, to thereby determine exactly in direct ratio, the fuel consumption of the motor and preferably comprises an upper float chamber 29 in which a float 30 determines the positioning of a needle valve 31 controlling the discharge of fuel from the flexible conduit 15 into the chamber 29.

A lower float chamber 32 is separated from the upper chamber 29 by a partition member 33 in which there is a central port or orifice 34 suitably tapered to provide a seat for valve 35 carried upon the float 36 in the lower chamber 32.

In order to prevent the formation of a partial vacuum or other conditions tending to promote an improper control of liquid levels within such chambers, an air vent tube 37 extends from the upper portion of the lower float chamber 32 into the upper portion of the upper float chamber 29. A second air vent tube 38 extends from the upper portion of the upper chamber 29 outside the chamber 29 to permit entrance of atmospheric air thereto. As illustrated in Figures 1 and 2, the flexible conduit 17 connects the lower chamber 32 with the carburetor 18 of the vehicle.

The control valve illustrated in Figure 2 has been specially designed to satisfy certain mathematical requirements as well as performance requirements. To illustrate, the metering valve 35 whose movements are controlled by the position of float 36, is designed to move in direct ratio to the flow of fuel consumed by the internal combustion motor of the vehicle being tested.

Due to the arrangement of the superposed chambers, it is necessary to maintain a substantially uniform hydrostatic head in the uppermost chamber, as otherwise the metering valve position determined by the position of float 36 will be influenced in part at least by factors other than the flow of fuel to the motor. For this reason, the action of input valve 31 is of considerable importance to the efficiency of the measuring mechanism and must vary the size of the orifice opening in the inlet to the chamber in direct relationship to the rate of flow of fuel through port 34, which is the factor actually measured by the mechanism in the determination of fuel consumption.

To eliminate the possibility of mechanical error arising from conditions of friction or other causes, it is preferred to employ separate controls, such as the valve 31 illustrated in Figure 2 and the metering valve 35 also illustrated therein. However, it will be understood that the essential condition is the maintenance of a substantially constant head in the upper chamber 29 and any means for attaining this object will be within the spirit and scope of the present invention.

In order that the amount of fuel flowing from the upper chamber 29 into the lower chamber 32 will be in a direct ratio to the position of the lower float 36, the valve 35 is provided with a direct ratio metering portion 35a extending through port 34 into chamber 29. This portion is provided with a plurality of grooves 35b of triangular cross section, as best illustrated in Figure 3. Each groove tapers in width and depth from a zero position at the lower end of the valve to a cut of substantial width and depth at the upper end.

As float 36 moves up and down according to the amount of fuel consumed, the metering portion 35a moves up and down to vary the flow capacity of the orifice 34 in accordance with the valve position. Thus, a lowering of the float 36 produces an increase in the space of orifice passage at 34 by reason of the changed position of the grooves, and when the float 36 is in its uppermost position, the port 34 will be completely closed by reason of valve 35 being seated.

This structure permits a flow of fuel from the upper to the lower chamber in exact proportion to the movements of the float which is in direct proportion to and substantially the same as the amount of fuel being consumed by the motor at all times.

While the construction illustrated is a preferred embodiment, it will be apparent that the number of grooves may be varied to suit conditions and the length, shape and proportioning of the grooves likewise may be varied. An increase in the length of the grooves serves to increase sensitivity and conversely a decrease in the length lessens sensitivity.

While it will be obvious to those skilled in the art that the invention is not limited to specific sizes, an explanation of the dimensions of constructions well suited to satisfy operating requirements may be helpful to a better understanding of the invention. As originally designed, the valve provided for a two-inch movement with the depth of the grooves ranging from 0 to .086 inch. By extending the length to 4 inches and employing the same range of groove depth, the sensitivity of the control is virtually doubled.

Therefore, when it is desired to have extreme precision, such as for laboratory purposes, the greater length may be preferable. In the two-inch size, the metering valve is built for a maximum consumption capacity of 14 gallons per hour and as none of the present vehicles to which the invention has been applied has a capacity approaching 14 gallons per hour, the metering action is free from error.

It will be understood that in usual operation the metering valve must balance the combined area of the carburetor orifices in all cases except where the movement of fuel through the carburetor orifices is induced by pressures differing from and in excess of those influencing the movement through the orifice controlled by the metering valve.

In the case of motors of the Diesel type in which fuel is injected at high velocity under great pressure, the orifice size would not be the controlling factor and consequently the capacity of the metering valve would have to be adjusted to satisfy the fuel demand requirements of such a motor.

In the preferred construction, a rod 39 mounted at the upper end of the part 35a extends through the cover 30a of upper float chamber 29 and is provided with a universal joint as shown at 40 to prevent any jamming in the action thereof, which might result from misalinement of the parts or through shifting of the position of the rod when the vehicle is moving downhill, for example, which otherwise might not permit a free movement. An electrical short-circuiting assembly, shown in detail in Figure 2a, is supported at the upper end of the rod 39 for purposes hereinafter explained.

This assembly preferably comprises a threaded head 41 longitudinally adjustable upon the threaded end 42 of the rod 39. A tube 43, preferably of suitable insulating material, is carried by the head 41 and within the hollow portion of the tube a conductor tube 44 is provided in which a pair of conductive contacts 45 are located and urged in opposite directions by a spring 46.

The contact members 45 may be made of silver or silver alloy and preferably have rounded contact surfaces as illustrated.

This short-circuiting assembly being held on rod 39 will move conjointly with float 36 and its associated valve member 35.

Positioned adjacent the short-circuiting assembly and preferably, although not necessarily, on cover 30a is a variable resistance element here illustrated as comprising a pair of similar resistance coils 47 spaced apart and extending on opposite sides of the short-circuiting assembly throughout its range of movement. The coils 47 are wound with bare wire which is contacted by the electrical contact members 45 in their various movements responsive to actuation by the float.

An electrically conductive band 48 preferably made of silver is located adjacent the upper end of each coil 47 and the respective resistance coils are electrically connected therewith.

When valve 35 is in closed position and no fuel is being consumed by the motor, the respective contacts 45 will bear against the conductive bands 48. In such position, the head 41 may be adjusted on rod 39 to such a position that immediately upon opening of valve 35, the contacts 45 will move from bands 48 and begin to cut in a variable factor of resistance along the coils 47. As illustrated diagrammatically in Figures 6 and 7, the bands 48 are included in the resistance 47, the details of which will be explained hereinafter.

A suitable housing 50 is provided for each resistance coil 47 and provided with a vertical slot 51 which admits and serves as a guide for the short-circuiting assembly.

From the foregoing, it will be apparent that movements of the rod 39 under the influence of float 36 impart a changed position to the contacts 45 with relation to the coils 47 and thereby cut into and out of the circuit 49 varying amounts of resistance which are in direct proportion to the position of float 36. As the float 36 is designed to assume variable positions in direct proportion to the amount of fuel delivered through conduit 17 to the carburetor 18 of the motor, the variable resistance thus assumes a direct proportion to the factor of fuel consumption.

To this end, the design and arrangement of the float chambers are of considerable importance. It is intended that a substantially constant depth of gasolene be maintained in the upper chamber 29 and the intake valve 31 is made responsive to the sensitive float 30 so that when the level of the gasolene in chamber 29 drops even a very small amount, the input valve opens to allow more gasolene to enter the chamber. Such a momentary variation involves such a minor fraction of the total static head that whatever error may be present is negligible in the indicating of actual conditions.

To further avoid any abnormal conditions in maintaining a constant head, the chamber is designed to eliminate any sharp corners or angles against which the fuel will move and the creation of eddy currents is thereby eliminated.

Having thus satisfied the practical requirements for the maintenance of a substantially constant static head, the next problem in design is to provide a practical embodiment of the substantially constant coefficient of discharge. To this end, the orifice arrangement previously described has been provided and the cross sectional area of the chamber 29 immediately above the orifice is relatively large in comparison with such orifice. By having a valve which affords varying areas of opening corresponding to the fuel demand, the desired results can be obtained. The lower chamber 32 which receives the fuel admitted through orifice 34 is provided with a float whose diameter is only slightly smaller than the diameter of the chamber. This float is not pivoted, but is free to move upward or downward in response to any variations in level.

As a consequence, a downward movement is imparted to the float 36 as soon as the motor draws off any of the fuel from chamber 32 and such downward movement will continue until the input of gasolene through orifice 34 is equal to the outward flow to the engine. As soon as such condition is obtained, the movement of the float will stop and equilibrium will be maintained until the rate of flow of gasolene from lower chamber 32 again changes. The valve 35 having a vertical movement directly proportionate to the flow of gasolene from the chamber also functions through the intermediary of the short-circuiting assembly to incorporate a variable resistance factor effecting generator output.

In order that the electrical output of the generator 25 may be in direct proportion to its speed of rotation and thereby in direct proportion to the actual forward travel of the out-rigger wheel 28 or any equivalent thereof, the generator must be designed so that all factors effecting its electrical output remain constant, other than the one factor of the R. P. M. of its rotor.

To this end, it is preferred to energize the field of the generator from a battery. The value of the energizing current may be conveniently controlled by means of a rheostat and a suitable indicating ammeter in the battery circuit. Such an arrangement permits a ready determination of the correct energization of the generator field at any time.

Other satisfactory means may be substituted in such an assembly, as, for example, by using certain magnetic alloy materials, permitting the use of permanent magnets in place of the battery energizing field. Therefore, the description of such a battery energizing field will be merely illustrative.

To afford a better understanding of the actual operation of the structure illustrated in the various views, reference is now made to the wiring diagrams in Figures 5, 6 and 7.

Referring first to Figure 5, the field 25a of the generator 25 is in conductive connection with a battery 52. A variable resistance or rheostat is located within the circuit, as indicated at 53, and a milliammeter 54 is connected into the battery-field circuit so that upon closing the switch the variable resistance or rheostat 53 may be adjusted to energize the field 25a to a predetermined value.

The generator 25 of the present design, having all its electrical factors constant, including the energization of its field, will have its electrical output acting as a direct function of the speed of its rotor. As a consequence, another milliammeter 56 connected through the resistance with the brushes 57 of the generator 25, upon closing of a switch 58, will indicate in miles per hour the forward travel of the vehicle to which the unit has been applied. In obtaining such a recording, it is preferred to have the dial of milliammeter 56 calibrated in miles per hour values with reference to the movements of its needle 56a, but it will be apparent that if other units of measure are desired, the dial may be calibrated accordingly.

Referring now to Figure 6, the battery 52 is shown connected in the circuit 49 which includes the variable resistance or rheostat 53. The milliammeter 54 controlled by switch 55 may again be used to determine the position of the variable resistance 53 and thereby provide a means of determining the value of the current flowing in the field of the generator.

As previously explained, the resistance coils 47 interpose a variable factor of resistance in circuit 49 in accordance with the position of contacts 45, moved by the rod 39, as a direct function of the amount of fuel being delivered to the motor.

Therefore, when another milliammeter 59 is connected in the circuit 49 upon closing a control switch 60, it will indicate variations in the basic current flow in circuit 49 in direct proportion to the amount of fuel being consumed by the motor. The dial of this milliammeter 59 may be calibrated so that the movements of its needle 59a will read in units of gallons per hour of fuel passing through the fuel flowmeter 14 to the carburetor 18 of the motor.

In order to obtain an immediate miles per gallon reading, it is necessary that the two factors of miles per hour travel and gallons per hour consumption be integrated. The circuit utilized for such integration is illustrated in Figure 7.

Referring thereto, the field 25a of generator 25 is energized from battery 52 and the value of such energization is controlled by the variable resistance or rheostat 53 as indicated on the milliammeter 54 when control switch 55 is closed. The brushes 57 of generator 25 are connected in the circuit 49 which also includes the variable resistance coils 47 interposing the variable factor of resistance in the circuit 49, as previously explained.

With such an arrangement, the milliammeter 61 in circuit 49 when its control switch 62 is closed will indicate the output of the generator 25 which is determined by the forward speed of the vehicle in miles per hour divided by the amount of fuel delivered to the motor in gallons per hour. As a consequence, the movements of the needle 61a of milliammeter 61 are in direct proportion to the miles of travel of the vehicle per gallon fuel consumed by the motor at all times. The dial of the milliammeter 61 can be calibrated in units designating miles per gallon performance and the needle 61a will continuously indicate, and with substantial accuracy, the actual performance of the vehicle, regardless of the variations in factors affecting vehicle performance, as noted hereinbefore.

For the usual testing operation, indicating instruments are entirely satisfactory and have been described with reference to the illustrated circuits of the present invention.

Furthermore, while the present construction has been illustrated with reference to the performance of an automobile, it will be apparent that any truck, bus or railway locomotive also may utilize the performance recording principles and structure of the present invention.

Also, by substituting a suitable wind propeller in place of the out-rigger wheel 20, the present construction could be utilized to indicate the efficiency of an airplane, and similarly, by substituting a water propeller for the out-rigger wheel 20, performance measurements of motor boats and ships could be indicated with the present invention.

Figure 4:
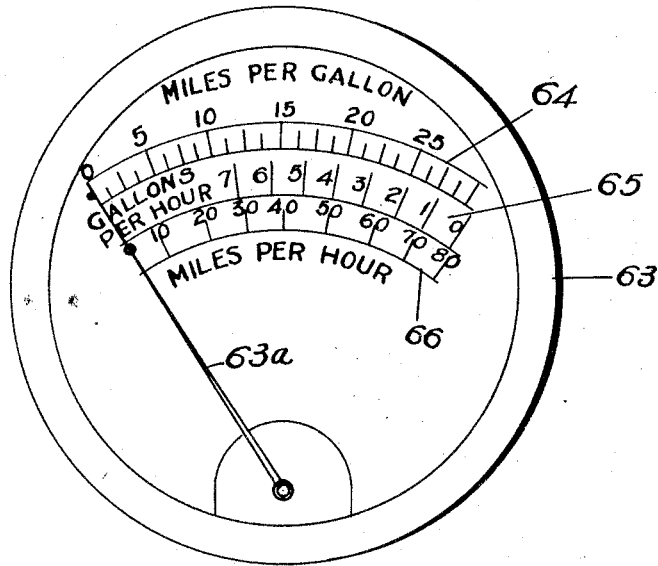
Figure 4 is an elevation of one type of indicating instrument used with apparatus of the type shown in Figure 1.

While in many instances it will be preferable to use the separate milliammeters 56, 59 and 61 for certain types of uses, a single indicating instrument will be preferred. Such an arrangement has been illustrated in Figure 4.

In this instrument a plurality of scales 64, 65 and 66 are calibrated on a single dial to indicate respectively miles per gallon, gallons per hour, and miles per hour in association with a single needle 63a.

The same milliammeter 63 also may serve the purpose of milliammeter 54 and it will be apparent that by using a suitable multi-pole switch as a replacement for switches 55, 58, 60 and 62 of the circuits hereinbefore described, proper connections may be made with the common milliammeter 63 to permit initial calibrating of the base value of the energizing currents, as well as to permit reading of the various calibrated scales of the instrument when desired.

While in most instances it will not be feasible to use an A. C. generator in place of the D. C. generator of the preferred form, it is within the contemplation of the invention that such a generator may be used by incorporating a variable impedance in circuit 49 as the variable resistance factor thereof.

The out-rigger wheel 20 used as the medium for measuring travel of the vehicle has many advantages as explained hereinbefore, but under certain circumstances, such as permanent installations on automobiles, trucks and buses, it may be preferable to drive the generator from some part of the vehicle, such as the propeller shaft thereof. In such an arrangement, the assembly as illustrated herein may be used except that the power take-off for the generator would be from the propeller shaft and in direct proportion to its rate of movement.

Likewise, in such an arrangement the fuel metering device preferably would be installed adjacent the motor within the hood enclosure or could be made as an added part of the carburetor.

Throughout the specification, the expression "direct ratio" has been used to designate a relationship which does not necessarily imply an exact mathematical relationship. Obviously, where the drive of the generator is described as being in direct ratio to the speed of the vehicle, some slight factors of mechanical error may be involved and such expression should be understood to mean substantially direct ratio rather than interpreting it in a strict mathematical sense.

Changes and modifications of the operation and structure as described hereinbefore may be availed of within the spirit and scope of the invention as defined in the hereunto appended claims.

What we claim and desire to secure by Letters Patent is:

1. The system of determining distance travelled by a self-propelled vehicle per unit of fuel consumed thereby, which comprises means for generating a variable electrical current in direct ratio to the speed of a self-propelled vehicle, means for measuring the flow of liquid fuel being delivered to the motor of said vehicle, means for modifying the value of the generated current in direct ratio to the flow of fuel to the motor instantaneously with the measurement thereof, and means for indicating the resultant value in units of distance travelled per unit of fuel consumed.

2. The system of determining efficiency of a self-propelled vehicle, which comprises mechanism for generating a current of electricity in direct ratio to the speed of the vehicle, an element for continuously measuring the flow of fuel to the motor of the vehicle, means for modifying said current of electricity in direct proportion to changes in the flow of fuel, said last named means being constructed and arranged for actuation by said measuring element instantaneously with its measurement of fuel flow, and means for producing a visible indicia of the resultant value in units of efficiency performance.

3. A system of the character disclosed comprising means for generating a current of electricity in direct ratio to the speed of travel of a self-propelled vehicle, means for continuously measuring the flow of liquid fuel to the motor of said vehicle, said metering means comprising upper and lower fuel chambers, there being a fuel-conductive passage between the chambers, a float in the lower chamber, a metering valve carried on the float and positioned in said passage, means for supplying liquid fuel to said upper chamber, and an electrical contactor carried on said valve and movable conjointly therewith, an electrical circuit conductively connected with said generating means and inclusive of a variable resistance positioned adjacent said contactor to be varied by its movements in direct proportion to the fuel passing the metering valve, and means for measuring the resultant current in units of distance traveled per unit of fuel consumed.

4. A system of the character disclosed comprising means for generating a current of electricity in direct ratio to the speed of travel of a self-propelled vehicle, means for continuously metering the flow of liquid fuel to the motor of said vehicle, said metering means comprising a chamber for liquid fuel, a float in said chamber, a metering valve controlling flow of liquid fuel to said chamber, means for supplying liquid fuel to said metering valve, and an electrical circuit inclusive of a variable resistance conductively connected with said generating means, means actuated by movements of said valve and float for varying said resistance in direct ratio to the amount of fuel passing said valve, and means for measuring the resultant current in units of distance traveled per unit of fuel consumed.

5. A system of the character disclosed comprising means for generating a current of electricity in direct ratio to the speed of travel of a self-propelled vehicle, means for continuously of said vehicle automatically responsive to the fuel requirements of the motor, means for supplying liquid fuel to said metering means, and an electrical circuit inclusive of a variable resistance conductively connected with said generating means, means actuated by the metering means for varying said resistance in direct proportion to the fuel used by the motor, and means for measuring the resultant current in units of distance traveled per unit of fuel consumed.

6. In a system of the character described, a direct current generator driven in direct ratio to the speed of a self-propelled vehicle, means for maintaining the field of said generator energized at a predetermined value, a circuit for the generator current, inclusive of a variable resistance, means for continuously measuring the flow of fuel to a motor, a resistance contactor connected in the circuit and movable by the fuel measuring means for varying said resistance in direct proportion to the flow of fuel to the motor, and means for measuring the resultant current in units of distance traveled per unit of fuel consumed.

7. In apparatus of the character described, a source of electrical energy generated in direct proportion to the forward speed of a self-propelled vehicle, means for supplying fuel to the engine of said vehicle, a float-actuated fuel metering valve associated with the fuel supply means responsive to and movable in direct proportion to the rate of flow of fuel to the engine, a current-indicating instrument, calibrated in units of distance traveled per unit of fuel consumed, a variable resistance in circuit with the energy source and the indicating instrument, and a movable means connected with said float for actuation thereby to vary the electrical resistance in direct proportion to the flow of fuel passing said valve.

EDWARD F. HARRISON.
RAYMOND C. GIESE.
OTTO A. PAWLICK.